United States Patent [19]
Molina

[11] 3,817,482
[45] June 18, 1974

[54] RACK FOR MAKING COFFEE
[76] Inventor: Alfonso P. Molina, 2801 N. Habana Ave., Tampa, Fla. 33607
[22] Filed: Sept. 7, 1972
[21] Appl. No.: 287,076

[52] U.S. Cl.............. 248/94, 248/97, 248/150, 248/152, 248/174
[51] Int. Cl............................................. B01d 23/28
[58] Field of Search......... 248/94, 95, 97, 150, 174, 248/152, 121, 166; 297/337; 108/147; 211/135, 178 R; 99/290; 126/38, 65, 9 R; 350/250

[56] References Cited
UNITED STATES PATENTS

| 710,790 | 10/1902 | Magerhans | 211/178 R X |
| 1,568,690 | 1/1926 | Parsons | 211/178 R X |
| 1,868,269 | 7/1932 | Beadle | 248/94 |
| 2,509,098 | 5/1950 | Howard | 248/94 |
| 2,593,750 | 4/1952 | Greitzer | 248/421 X |
| 2,780,081 | 2/1957 | Alexander | 248/94 X |
| 2,813,456 | 11/1957 | Ostrov | 248/150 X |
| 2,902,085 | 9/1959 | Bahnson | 297/115 |
| 2,905,418 | 9/1959 | Escartin | 248/94 |
| D179,992 | 4/1957 | Walker et al. | 248/150 |

FOREIGN PATENTS OR APPLICATIONS
129,216   4/1901   Germany .................. 350/250

Primary Examiner—Roy D. Frazier
Assistant Examiner—Rodney H. Bonck
Attorney, Agent, or Firm—John N. Randolph

[57] ABSTRACT

A coffee making rack having a top portion for supporting a cloth strainer containing ground coffee, and a bottom portion or base which is adapted to rest on a table or similar supporting surface and on which a cup, pot or other receptacle is adapted to be supported for receiving the coffee when hot water is poured into the open top of the strainer. The rack is formed of four pivotally connected sections, one end section of which constitutes the top portion and the other end section of which constitutes the base. The two intermediate sections, when extended, constitute a standard for supporting the top portion above and substantially parallel to the base. Lips or flanges on certain of the sections and which abut other of the sections limit the extent of pivotal movement of certain of the sections relative to one another in one direction to maintain the rack in an extended position. The rack sections are capable of being folded into a compact unit of approximately the size of any one of the rack sections for storage.

5 Claims, 5 Drawing Figures

PATENTED JUN 18 1974

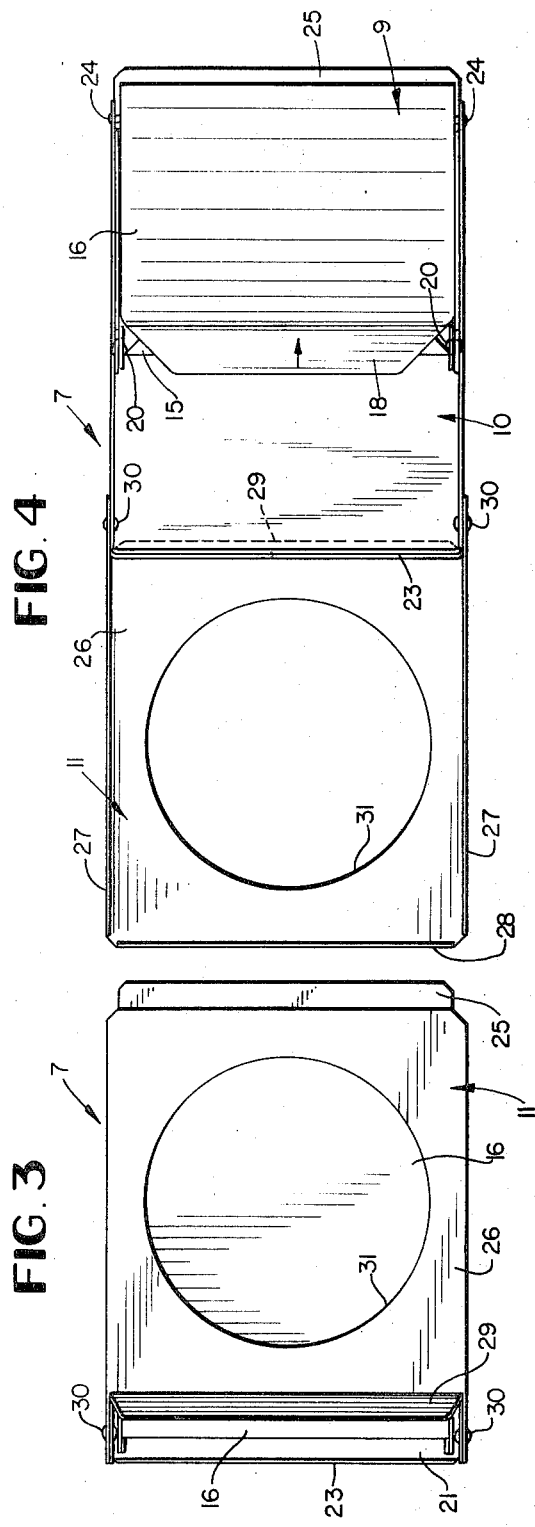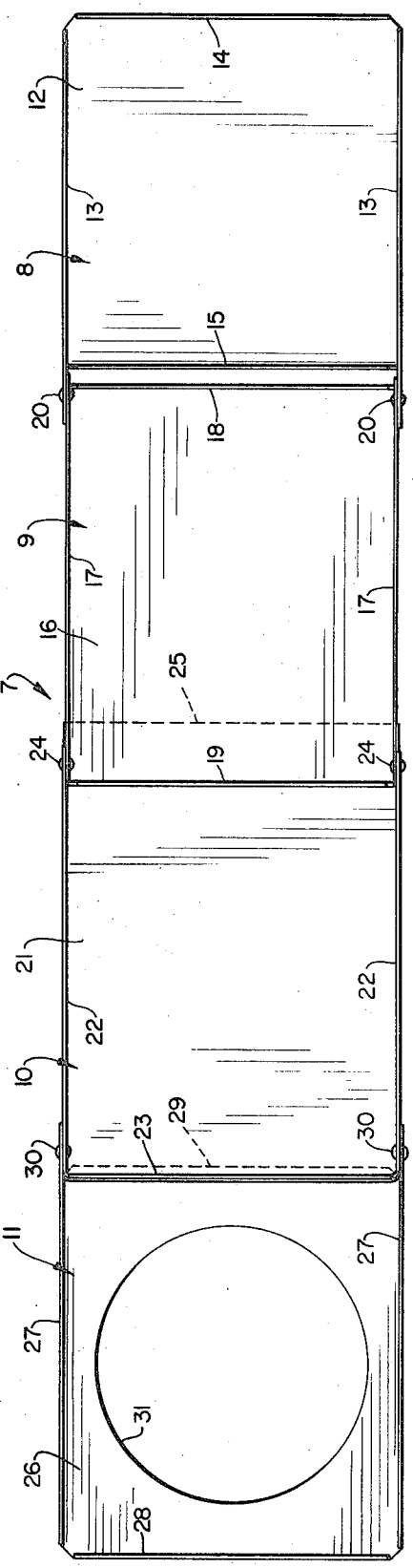

RACK FOR MAKING COFFEE

It is a primary object of the present invention to provide a coffee making rack which, when erected, provides a stable supoort for a coffee strainer and for a receptacle disposed beneath the strainer to receive the liquid coffee therefrom.

Another object of the invention is to provide a rack which may be readily collapsed and folded into a very compact form for storage.

Another object of the invention is to provide a rack which may be formed of sheet metal and so constructed that it may be readily maintained in a clean and sanitary condition.

Still another object of the invention is to provide a rack of attractive appearance enabling it to be feasibly utilized on a dining room table.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 3 is a top plan view showing the rack folded for storage;

FIG. 4 is a plan view showing the rack partially opened, and

FIG. 5 is a similar view showing the rack with the four sections full extended and in substantially the same plane.

DESCRIPTION OF THE PREFERRED EMBODIMENT

Figure 1:
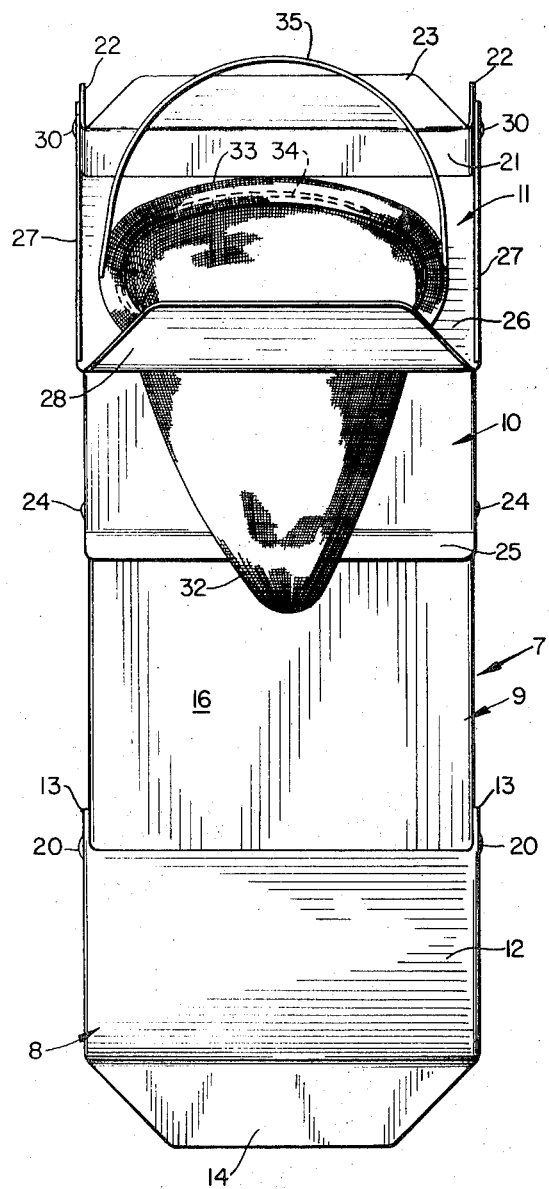
FIG. 1 is a front perspective view showing the rack in an erected, operative poosition and with a conventional cloth strainer applied thereto and supported thereby.

Referring more specifically to the drawings, the coffee making rack in its entirety and comprising the invention is designated generally 7 and is composed of four sections 8, 9, 10, and 11. The two end sections 8 and 11 constitute the base and top portions, respectively, of the rack 7. Each of the four sections is preferably formed of a single piece of sheet metal.

The base section 8 includes a wall 12, forming a platform, side flanges 13 which extend downwardly from the side edges of the platform 12, a depending outer flange or lip 14 which extends downwardly from an outer end of the platform 12 and which has a bottom edge disposed in the same plane as the bottom edges of the side flanges 13, and an inner lip 15 which extends downward from an inner end of the platform 12, between portions of the side flanges 13. The lip 15 terminates above the bottom edges of the flanges 13 and is spaced from inner ends of said flanges.

The section 9 includes a wall 16 having side flanges 17 which are spaced apart a distance slightly less than the spacing between the flanges 13, and end lips 18 and 19 which extend from the wall 16 in the same direction as the flanges 17, and neither of which is of a width greater than the width of said flanges 17. In the fully extended flat position of the rack sections, as illustrated in FIG. 5, the lip 15 is located adjacent to but spaced from the lip 18, and corresponding ends of the flanges 17 and disposed between the ends of the flanges 13, which project beyond the lip 15. The adjacent flanges 13 and 17 are pivotally connected together by aligned rivets 20.

Figure 2:
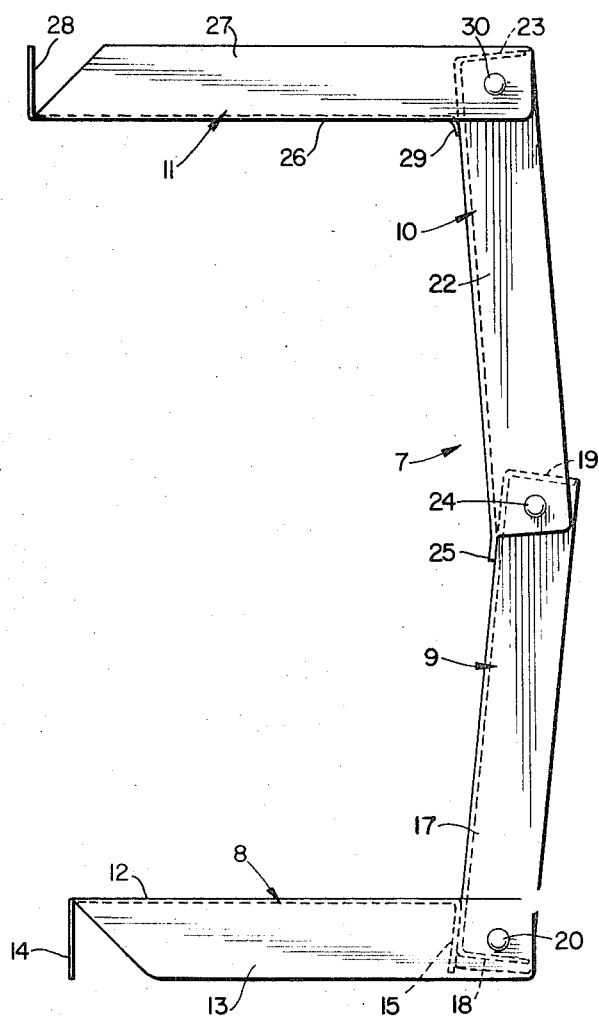
FIG. 2 is a side elevational view of the erected rack.

The rack section 10 includes a wall 21, which substantially corresponds with the wall 16, side flanges 22, and one end lip 23 which projects from the wall 21 in the same direction as the flanges 22 and which is of substantially the same width as said flanges. The flanges 22 are spaced apart a distance slightly greater than the spacing between the flanges 17 and the flanges 13, and the ends of the flanges 22, disposed remote from the lip 23, straddle the other ends of the flanges 17 and are pivotally connected thereto by aligned rivets 24. The wall 21, at the end thereof disposed adjacent the rivets 24, is extended slightly beyond the flanges 22 to provide a lip 25 which is disposed in a plane at an angle to the plane of the wall 21, as best illustrated in FIG. 2, for a purpose which will hereinafter become apparent.

The end section 11, constituting the top portion of the rack, includes a substantially flat wall 26 having side flanges 27 and a lip 28 at an outer end of the wall 26, which lip extends in the same direction as the flanges 27 and is of a width no greater than the width of the flanges 27. The ends of the flanges 27, disposed remote from the lip 28, extend beyond the inner end of the wall 26 and said inner end of the wall is bent to extend from the plane of the wall in the opposite direction from the flanges 27 to provide a lip 29, as seen in FIG. 2. The flanges 27 are spaced apart a distance slightly greater than the distance between the flanges 22 to receive the other ends of said flanges 22 therebetween. The adjacent flanges 22 and 27 are pivotally connected together by aligned rivets 30.

The wall 26 is provided with a large opening 31 to receive a conventional cloth strainer 32 which is substantially cone-shaped and which extends downwardly through said opening 31. The mouth 33 at the large upper end of the strainer 32 is maintained open by a metal ring 34 which is slightly larger than the opening 31 so as to rest on the upwardly facing surface of the wall 26, for supporting the strainer 32 in said opening. The strainer 32 is shown equipped with an upwardly extending bail-type handle 35.

A receptacle, not shown, such as a coffee cup or coffee pot is supported on the platform 12 directly beneath the strainer 32 which contains ground coffee, not shown, so that when hot water is poured into the strainer through its open mouth 33, the hot coffee will drip from the strainer into the pot or cup.

The rack 7 is folded for storage from its erected position of FIGS. 1 and 2 by swinging the end sections 8 and 11 away from one another to a fully extended position of the rack as seen in FIG. 5, with the four rack sections substantially coplanar and with the flanges thereof extending upwardly. The rack section 8 is then swung counterclockwise about the pivots 20 through an arc of approximately 180° to a position with the flanges 13 thereof straddling the flanges 17 and with the lip 14 disposed between the lips 18 and 19 and adjacent the latter. The two nested sections 8 and 9 are then swung counterclockwise about the pivots 24 to a position nested within the section 10. FIG. 4 shows the nested sections 8 and 9 approaching a position within the section 10. The section 11 is then swung clockwise about the pivots 30 to a position covering the sections 8, 9 and 10 and in which said sections are substantially nested within the section 11, as seen in FIG. 3.

The aforementioned procedure is reversed for returning the rack to an erected position, as seen in FIGS. 1 and 2, by swinging the section 11 counterclockwise about the pivots 30 through an arc of approximately 180°, after which the sections 8 and 9, as a unit, are swung about the pivots 24 through an arc of 180° in a clockwise direction, after which the section 8 is swung clockwise through another arc of 180° about the pivots 20 to position the rack sections substantially coplanar, as seen in FIG. 5.

The thus extended rack sections are then inverted and the sections 8 and 11 are swung about the pivots 20 and 30 in upward directions to assume positions substantially parallel to one another, as seen in FIG. 2. During this movement, the sections 9 and 10 pivot slightly relative to one another about the pivots 24 to assume their outwardly inclined positions of FIG. 2, with the lip 25 abutting the wall 16 to prevent further counterclockwise swinging movement of the section 10 relative to the section 9, for maintaining the rack in its erected position. The lip 29 bears against the wall 21 to maintain the top section 11 at an angle slightly in excess of 90° relative to the section 10 and in substantially a horizontal position, and a part of the wall 16 bears against the lip 15 to maintain the sections 8 and 9 disposed at an angle slightly greater than 90° relative to one another when the base section 8 is resting on a supporting surface, not shown, such as a table.

Various modifications and changes are contemplated and may be resorted to, without departing from the function or scope of the invention.

I claim as my invention:

1. A rack for making coffee comprising four rack sections having substantially parallel side flanges, pivot means connecting the flanges of the different sections for pivotally connecting the sections to one another in end-to-end relation, one end section comprising a base and being provided with a receptacle supporting platform, the other end section constituting a top portion, the two intermediate sections constituting a supporting standard supported by the base for supporting said top portion in an elevated position above the base when said intermediate sections are extended, said top portion being adapted to support a cloth coffee strainer and having an opening through which the strainer depends to a position substantially above said platform.

2. A rack as in claim 1, each of said sections being formed of a single piece of sheet metal.

3. Arack as in claim 2, said rack sections being sized and shaped to assume a folded position nested one within the other.

4. A rack as in claim 1, the flanges of certain of said sections being spaced apart distances different from the spacing between the flanges of certain of the other sections to permit the sections to assume nested positions relative to one another when the rack is folded.

5. A rack is in claim 4, certain of the rack sections having lips providing abutments for engagement with portions of adjacent rack sections for maintaining the rack in an erected operative position and for limiting swinging movement of each rack section in one direction relative to a rack section adjacent thereto.

* * * * *